United States Patent Office 3,169,630
Patented Feb. 16, 1965

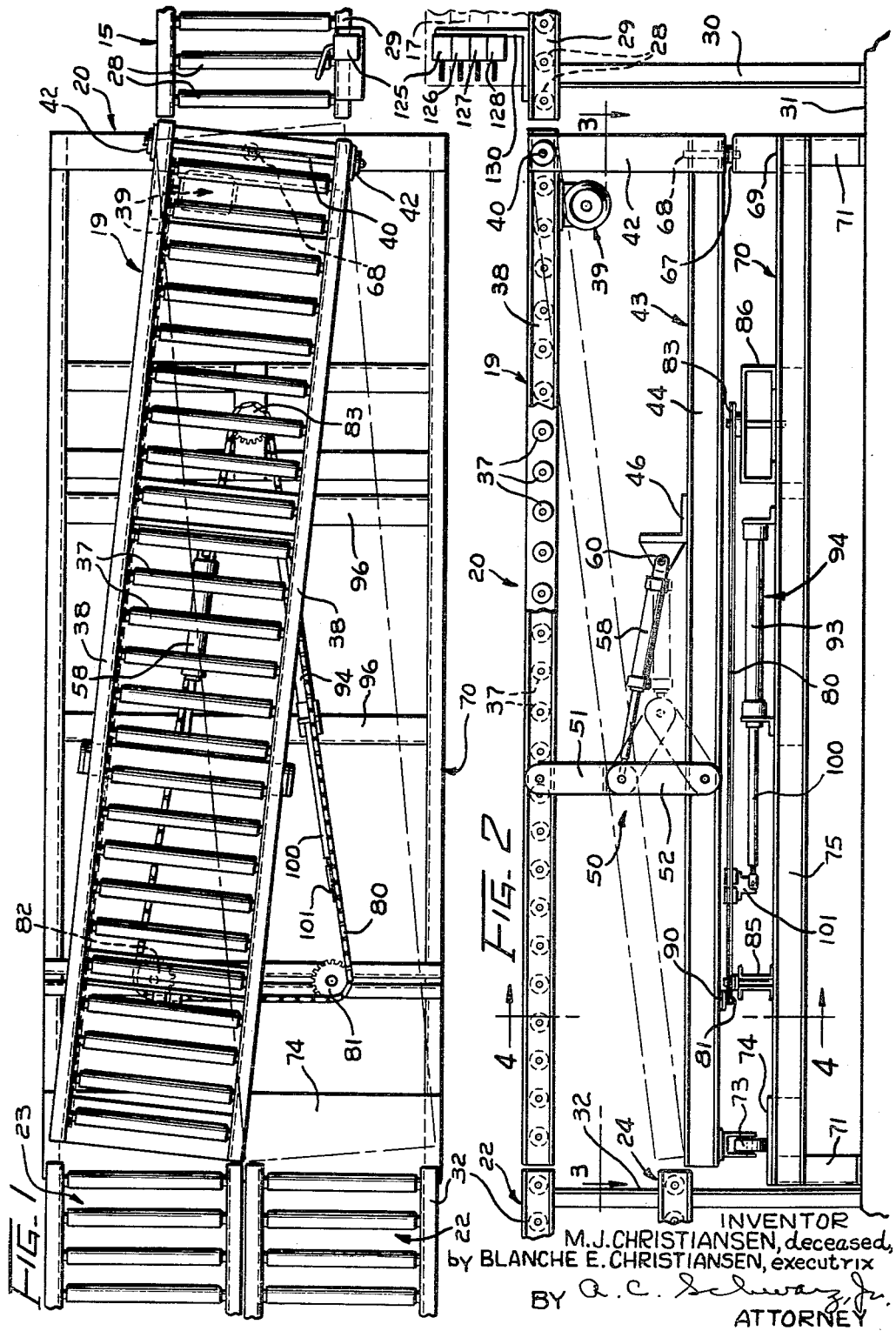

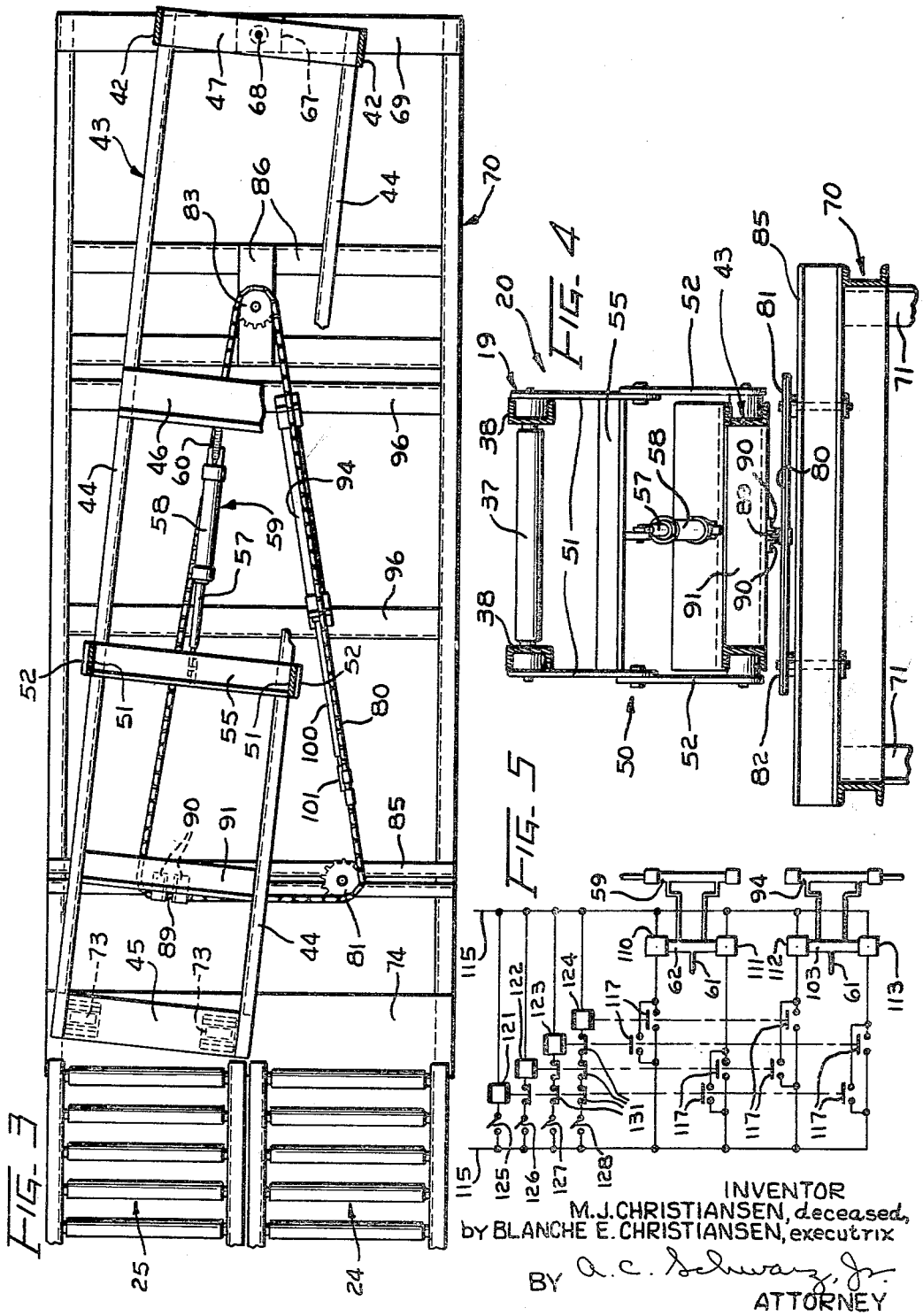

3,169,630
CONVEYOR MECHANISM
Milton J. Christiansen, deceased, late of Brookfield, Ill., by Blanche E. Christiansen, executrix, Brookfield, Ill., assignor to Western Electric Company, Incorporated, New York, N.Y., a corporation of New York
Filed Apr. 16, 1962, Ser. No. 189,224
1 Claim. (Cl. 198—38)

This invention relates to conveyor mechanism, and more particularly to a conveyor mechanism having a selectively movable section for distributing articles onto branch conveyors arranged in laterally spaced relation to each other vertically and horizontally.

An object of the invention is to provide an improved conveyor mechanism.

Another object of the invention is to provide an improved conveyor mechanism having a selectively operable section for directing articles onto branch conveyors arranged in laterally spaced relation to each other vertically and horizontally.

A conveyor mechanism illustrating certain aspects of the invention may include a pivoted conveyor section interposed between a main conveyor and a plurality of branch conveyors, the latter being arranged laterally relative to one another vertically and horizontally. The pivoted conveyor section is supported on a carrier for vertical pivotal movement about a horizontal axis at one end of the conveyor section with the one end of the conveyor section in vertical and horizontal alignment with the discharge end of the main conveyor for receiving articles therefrom. A first actuator on the carrier is selectively operable to raise and lower the free end of the pivoted conveyor section to various levels in alignment with the branch conveyors.

The carrier with the pivoted conveyor section supported thereon is mounted for horizontal pivotal movement about a vertical axis adjacent to the first conveyor, and a second actuator is operable to move the carrier horizontally to different positions with the free end of the conveyor section in alignment with the horizontally spaced branch conveyors. Control mechanism including a pluarlity of switches actuated by articles of various sizes on the main conveyor effect the selective operation of the first and the second actuators and the selective alignment of the discharge end of the pivoted conveyor section with the branch conveyors.

Other objects, advantages and novel aspects of the invention will become apparent upon consideration of the following detailed description, in conjunction with the accompanying drawings, in which:

FIG. 1 is a fragmentary plan view of the conveyor mechanism embodying the present invention;

FIG. 2 is a side elevational view of the conveyor mechanism;

FIG. 3 is a horizontal sectional view of the conveyor mechanism taken on line 3—3 of FIG. 2;

FIG. 4 is a vertical transverse sectional view taken on the line 4—4 of FIG. 2 and showing a movable section of the conveyor in a position intermediate two operative positions thereof; and FIG. 5 is a diagrammatic view of the electrical control circuit.

Referring now to the drawings, particularly FIGS. 1 and 2, the conveyor mechanism comprises a first conveyor 15 for receiving a plurality of articles 17 (FIG. 2) of different heights from a degreaser or other processing device (not shown) and advancing the articles onto a movable conveyor section 19 of a switching mechanism 20 for selectively distributing the articles onto a plurality of branch conveyors 22, 23, 24 and 25 in accordance with the size of the articles. The conveyor 15 is disclosed as a roller type having a plurality of rollers 28 mounted on a frame 29 and rotated by a suitable drive (not shown). The frame 29 is supported on legs 30 resting on a floor or base 31. A frame 32 on the base supports the branch conveyors 22–25 in lateral relation to each other vertically and horizontally and with the conveyors 22 and 23 disposed in side-by-side relation to each other at an upper level and the conveyors 24 and 25 disposed in side-by-side relation to each other at a lower level and in vertical alignment with the conveyors 22 and 23, respectively.

The branch conveyors may be driven or of the gravity feed type. The movable conveyor section 19 is of the roller type having a plurality of rollers 37 supported in a pair of side frames 38 and driven by a chain and motor drive 39 indicated conventionally in FIGS. 1 and 2. At one end adjacent to the main conveyor 15 the conveyor section 19 is pivotally supported on a horizontal rod 40 for pivotal movement about the horizontal axis of the rod. The ends of the rods 40 are supported in the upper ends of a pair of arms 42 extending upwardly from a movable carrier 43. The carrier 43 includes a pair of side frames 44 interconnected by a plurality of cross frame members 45, 46 and 47.

Intermediate the ends thereof, the movable conveyor section 19 and the movable carrier 43 are interconnected by a toggle linkage 50 including a pair of upper links 51 and a pair of lower links 52 pivotally connected to each other and pivotally connected respectively to the longitudinal frame members 38 of the conveyor section 19 and the frame members 44 of the movable frame 43. A cross bar 55 (FIG. 3) interconnecting the lower ends of the toggle links 51 is pivotally connected to a rod 57 of a piston which is reciprocable within a cylinder 58 of an air operated actuator 59. This actuator is pivotally connected at one end to a bracket 60 on the cross frame member 46 of the carrier 43.

Compressed air from a suitable supply line 61 thereof (FIG. 5) is admitted to opposite ends of the actuator 59 under control of a valve 62 to effect the actuation of the toggle 50 to straight and bent conditions and the vertical pivotal movement of the conveyor section 19 to and from the upper and lower positions indicated in full and dotted lines respectively in FIG. 2. In its upper position, the movable conveyor section 19 is disposed horizontally with the free end thereof level with the upper pair of branch conveyors 22 and 23 and in its lower position, the free end of the conveyor section 19 is level with the lower pair of branch conveyors 24 and 25.

At one end thereof the carrier 43 is supported on a bearing member 67 (FIGS. 2 and 3) for pivotal movement about a pivot pin 68 which extends vertically upwardly from the bearing member through apertures in the cross member 47 of the carrier. The bearing member 67 is mounted on a cross member 69 of a stationary frame 70 which is supported by feet 71 on the floor 31. At its other end, the carrier 43 is provided with a pair of casters 73 which ride on a horizontal plate 74 that extends across and interconnects a pair of longitudinal frame members 75 of the stationary frame 70. As clearly shown in FIG. 1, the stationary frame 70 is wider than the conveyor 15 and supports the movable conveyor section 19 for horizontal swinging movement to its two operative positions with the discharge end of the section 19 in alignment with the horizontally offset branch conveyors 22–25 as indicated in full and dotted lines in FIG. 1.

Mechanism is provided for shifting the movable conveyor section 19 horizontally about the vertical pivot 68 to its two operative positions which includes an endless chain 80 trained around three sprockets 81, 82 and 83. The sprockets 81 and 82 are rotatably supported in spaced relation to each other on a cross frame member 85 and the sprocket 83 is adjustably supported on a suitable frame member 86 of the stationary frame 70. An operative connection between the chain 80 and the free end of the carrier 43 is effected by a block 89 (FIG. 4) which extends upwardly from the portion of the chain 80 between the sprockets 81 and 82 into a slot formed between a pair of spaced guide members 90 secured to the underneath side of a cross member 91 of the carrier 43.

Reciprocatory movement is imparted to the chain 80 by a fluid operated actuator 94 to effect the movement of the block 89 transversely of the frame 70 and the pivotal movement of the carrier 43 and the conveyor section 19 thereon about the pin 68 to and from the two operative positions of the conveyor section 19 in a lateral direction. The actuator 94 which is fixedly secured to a pair of cross members 96 of the stationary frame 70 comprises a cylinder and a piston, the piston having a rod 100 which is secured at its end to a lug 101 on the chain 80. Under control of a valve 103 (FIG. 5) compressed air from a supply line 61 is selectively admitted to opposite ends of the cylinder to effect the lateral shifting of the conveyor section 19 from one operative position to another.

Each of the valves 62 and 103 is of the type having a flow reversing element therein movable to one position by a solenoid at one end thereof and movable to a second position by a second solenoid at the other end thereof. The valve 62 is provided with solenoids 110 and 111 and the valve 103 is provided with solenoids 112 and 113, and the solenoids 110-113 are each connected across power lines 115 with a pair of relay contacts 117, the contacts of each pair being connected in parallel as shown in FIG. 5. The relay contacts are actuated by relays 121-124 which are connected across the power lines 115 in series with control switches 125, 126, 127 and 128, respectively. The control switches 125-128 are mounted on a support 130 in superposed relation to each other near the end of the conveyor 15 adjacent to the path of travel of the articles 17 thereon. Disposed at different elevations the switches 125-128 are adapted to be selectively operated by the articles 17 of different heights as indicated in FIG. 2.

The arrangement of the control mechanism is such that as the articles 17 approach the end of the conveyor 15, one or more of the switches are actuated to energize a selected relay and effect the operation of the actuators 58 and 94 in predetermined directions resulting in the selective movement of the free end of the pivotal conveyor section 19 to one of its four positions in alignment with one of the four branch conveyors 22-25. Even though one, two, three or four switches may be closed at one time by the articles of different heights, it will be understood that interlocking contacts 131 associated with the several relays 121-123 operate to render only the proper one of the relays operative in accordance with the size of the article and in this manner effect the switching of the articles to the selected branch conveyors in accordance with their size.

Although the articles 17 have been indicated as being of various heights for actuating the various control switches 125-128, it will be understood that the articles may be of uniform size and have switch operating elements detachably connected thereto for effecting the selective actuation of the control switches 125-128.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

In a conveyor system having a main conveyor, a first pair of branch conveyors disposed at one elevation, and a second pair of branch conveyors disposed at a different elevation in vertically spaced and aligned relation to the first branch conveyors, a mechanism for selectively advancing articles from the main conveyor to the branch conveyors which comprises:

a stationary frame disposed between the main conveyor and the branch conveyors;

a carrier supported at one end on said stationary frame for pivotal movement about a vertical axis adjacent to the main conveyor;

roller means for supporting the other end of said carrier for horizontal pivotal movement on said frame;

a shiftable conveyor section mounted on said carrier for horizontal pivotal movement therewith and supported at one end for vertical pivotal movement about a horizontal axis intersecting said vertical axis;

toggle links interconnecting said carrier and said conveyor section for supporting the free end of said conveyor section in an upper position level with the upper branch conveyors when said toggles are in straight condition and for moving said conveyor section to a lower position with the free end level with the branch conveyors;

a first fluid-operated actuating means mounted on said carrier for actuating said toggle links to and from said straight condition;

a horizontally disposed endless chain supported on said frame for movement of a portion of the chain transversely of said frame and said conveyor section;

means interconnecting said portion of said chain with said carrier;

a second fluid-operated actuating means mounted on said frame for moving said chain back and forth through a predetermined distance to effect the horizontal pivotal movement of said carrier and said conveyor section thereon to predetermined positions with the free end of said conveyor section in alignment with the branch conveyors; and means including a plurality of control elements disposed at different elevations adjacent the main conveyor and variously actuatable by different articles being conveyed for effecting the selective operation of said first and said second actuating means.

References Cited in the file of this patent

UNITED STATES PATENTS

| | | |
|---|---|---|
| 483,213 | Gaumer | Sept. 27, 1892 |
| 1,232,882 | Alvey | July 10, 1917 |
| 1,808,134 | Gotthardt et al. | June 2, 1931 |
| 2,341,278 | Long | Feb. 8, 1944 |
| 2,804,192 | Armstrong et al. | Aug. 27, 1957 |
| 2,971,631 | Gray | Feb. 14, 1961 |